United States Patent [19]

Allen

[11] 4,278,963
[45] Jul. 14, 1981

[54] AUTOMOTIVE ANTI-THEFT SYSTEM

[76] Inventor: Luther Allen, 15806 Biltmore Ave., Cleveland, Ohio 44128

[21] Appl. No.: 965,845

[22] Filed: Dec. 4, 1978

[51] Int. Cl.³ .................. B60R 25/04; B60R 25/10
[52] U.S. Cl. ........................................ 340/64; 180/287; 307/10 AT; 340/63
[58] Field of Search .............. 340/64, 63; 301/10 AT; 180/287

[56] References Cited

U.S. PATENT DOCUMENTS

| | | | |
|---|---|---|---|
| 3,209,326 | 9/1965 | Heiser | 340/64X |
| 3,430,058 | 2/1969 | Yoshida | 340/64X |
| 3,605,087 | 9/1971 | Nine | 340/64 |
| 3,614,734 | 10/1971 | Davis | 340/64 |
| 3,707,702 | 12/1972 | Plattner | 340/64 |
| 3,738,444 | 6/1973 | Ruby | 340/64 X |
| 3,956,732 | 5/1976 | Teich | 340/64 |
| 4,107,543 | 8/1978 | Kaplan | 340/64 X |
| 4,151,509 | 4/1979 | Winczei | 340/64 |

*Primary Examiner*—John W. Caldwell, Sr.
*Assistant Examiner*—Joseph E. Nowicki
*Attorney, Agent, or Firm*—Meyer, Tilberry & Body

[57] ABSTRACT

An improved automotive anti-theft system is provided which will allow an automobile to be started only by those knowing the proper code. The unit also will sound an alarm when any of the user designated compartments are entered without following the proper procedure. The system is designed so that if a failure of any component occurs while the automobile is not running, the automobile will not start; and if a failure occurs when the automobile is running, normal operation of the automobile will not be impaired.

1 Claim, 1 Drawing Figure

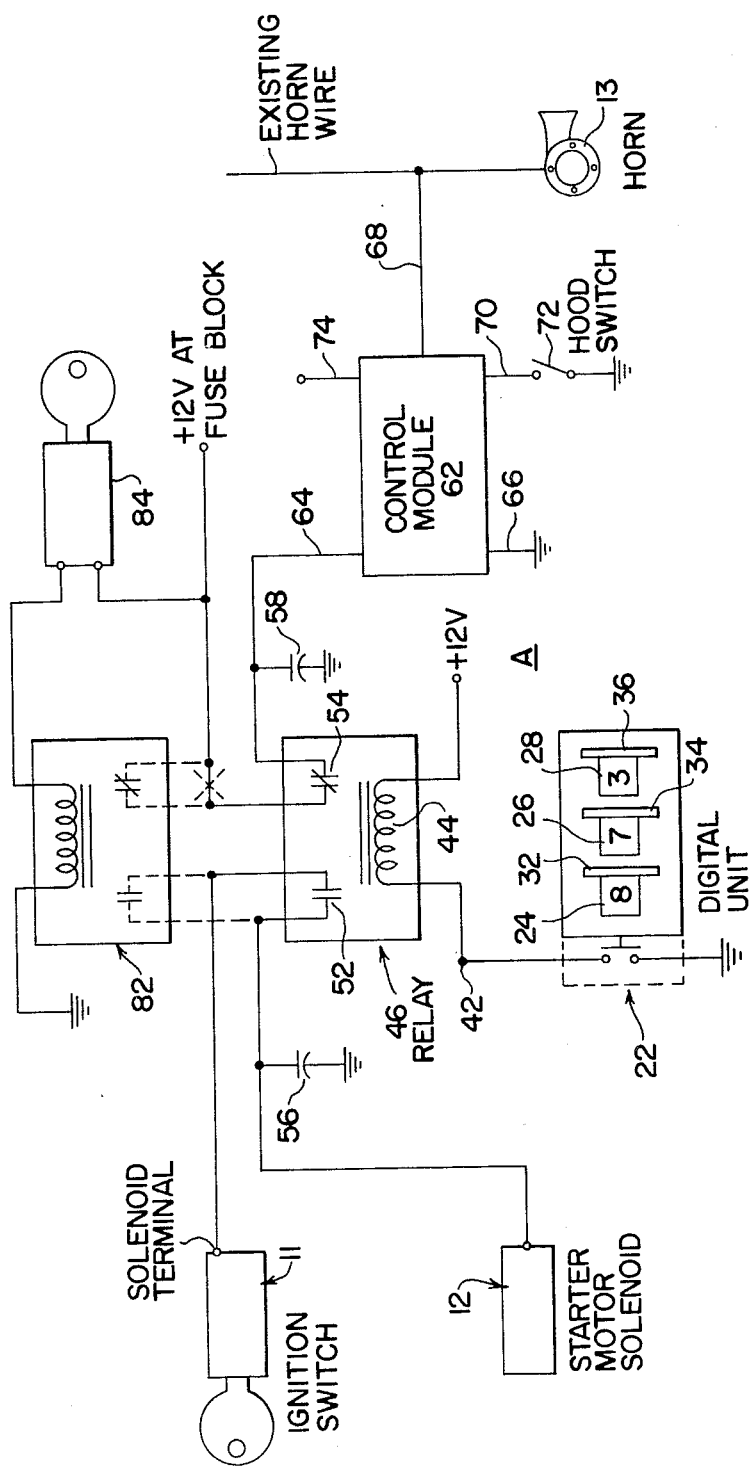

AUTOMOTIVE ANTI-THEFT SYSTEM

This invention relates to the art of anti-theft devices for automobiles and more particularly to an improved anti-theft system for sounding an alarm while not disabling a vehicle ignition system.

BACKGROUND OF THE INVENTION

Numerous types of automotive anti-theft devices are presently manufactured. These devices generally operate in one of two ways.

The first group of devices prevent the operation of an automobile by an unauthorized person through interference in the ignition circuit. Unless these devices are properly disengaged before attempting to start the automobile, the device will prevent the ignition coil of the automobile from being energized and thus prevent the car from operating. This first group of anti-theft devices has a major drawback. If failure occurs in one of the system components while the automobile is in operation, coil current may be interrupted. This results in an immediate loss of power, and in cars equipped with power-steering and power-brakes, an immediate and abrupt change in the control functions of the automobile. This can and has resulted in dangerous situations especially on high speed highways.

The second group of anti-theft devices or systems relies upon an alarm which will sound upon on unauthorized entry or an unauthorized attempt to start the vehicle. These systems rely on trigger systems at key points in the automobile such as passenger compartment doors, hood latches, trunk lids or the like. These systems require numerous auxilliary switches which are often installed by inexperienced people and often placed in paths of water drainage. Failure can sometimes occur at these switch points, completely disabling the system.

Some systems combine elements from both groups to arrive at a more comprehensive anti-theft system. Most of these systems while incorporating the advantages of both systems, also incorporate their problems.

THE PRESENT INVENTION

The present invention relates to an improved automotive anti-theft system which will prevent the unauthorized starting of an automobile without interfering with the normal ignition circuit.

In accordance with the invention, there is provided an automotive anti-theft system which prevents starting of an automobile by interrupting the starter motor solenoid circuit, not the automobile ignition circuit.

Further in accordance with the invention, an automotive anti-theft system is provided which requires no key.

Further in accordance with the invention, an automotive anti-theft system is provided using a digital combination unit for control.

Further in accordance with the invention, an automotive anti-theft system is provided which is controlled by an easily ascessible digital unit and is responsive to any unauthorized opening of passenger compartment doors without the necessity of additional trigger switches at these entry points.

The primary object of the present invention is the provision of an automotive anti-theft system which is controlled by a digital unit, which when armed will sound an alarm upon unauthorized entry of the vehicle passenger compartment and will prevent unauthorized starting of the automobile.

Another object of the present invention is the provision of an automotive anti-theft system which does not interfere with the ignition circuit of the automobile.

Another object of the present invention is the provision of an automotive anti-theft system which will not interfere with engine function or control functions should the system fail while the automobile is operating.

A still further object of the present invention is provision of an automotive anti-theft system which is controlled by a single digital display and control unit which can be mounted in an automotive dash to appear much like the original automotive equipment.

These and other objects and advantages of the invention will become apparent from the following description of a preferred embodiment.

BRIEF DESCRIPTION OF THE DRAWING

The FIGURE presented is a combined schematic and wiring diagram illustrating the preferred embodiment of the present invention.

THE PREFERRED EMBODIMENT

Referring now to the drawing wherein the showing is for the purpose of illustrating the preferred embodiment only and not for the purpose of limiting same, anti-theft system A is used in an automotive electrical system including an ignition switch 11, a starter motor solenoid 12 and a horn 13. Three devices are added to these already existing components and the wiring of the existing components is slightly changed. As almost all automobiles manufactured within the last five years are equipped with a twelve volt electrical system, the invention will be described with reference thereto. It should be appreciated that the invention can be easily modified to accommodate other electrical systems.

A digital switch and indication unit 22, is installed in the dash of an automobile. This digital unit normally contains numerical displays 24,26,28 and associated thumb wheels 32, 34, 36. The thumb wheels can be manually rotated to change the numeric display and the condition of an associated electrical switch. The digital unit is connected to electrical ground, a source of positive voltage and to one terminal 42 of the coil 44 of a control relay 46. Relay 46 has its other coil terminal 48 connected to a source of positive voltage.

The relay coil 44 is energized only when the numerical display of the digital unit 22 is positioned at the correct preset value. The digital units presently preferred are supplied by the Digitran Company of 855 South Arroyo Parkway, Pasedena, Calif. 99105 and available in a number of different configurations. The preferred configuration is presently the Digitran Company's series 2300 Module used with three units to provide 1000 possible combinations. The units can be set up so that only one of these 1000 combinations will cause the associated electrical switch to conduct.

Relay 46 is equipped with two sets of contacts. Contacts 52 are normally open and contacts 54 are normally closed. The installation of relay unit 46 is accomplished by making the appropriate connections to positive voltage and the digital unit 22 already describe and breaking the connection between the ignition switch 11 and the terminal of the starter motor solenoid 12. The normally open contacts 52 of relay 46 are inserted in this line. Capacitor 56, a 0.1 microfarad, 200 volt capacitor is connected between this line and ground to prevent pitting of the relay contacts. One terminal of the normally closed contacts 54 are connected to a source of positive voltage. This source is normally at the fuse block in the passenger compartment of the car. The other terminal of contacts 54 is connected to control module 62.

The control module 62 can be any of a number of presently available electronic anti-theft control devices. The preferred control module is available from Harcor International, Inc. located at 774 West Algonquin Road, Arlington Heights, Ill. 60005 and is identified by their part number 3001. This control module is equipped with five leads which are connected as follows. Lead 64, a red wire, is connected to the normally closed contact 54 in relay 46. Lead 66, a black wire, is connected to any convenient ground point. Lead 68, a green wire, is connected to the horn lead already existing in the automobile. Lead 70, a white wire, can be connected to a plunger switch 72 which is optionally installed in a position to close a connection to the ground when the hood is opened. The remaining red lead 74 is left unconnected. In the Harcor system this lead is normally used to disable the ignition circuit and thus prevent the automobile from running. This feature is not desired in the present invention.

Only two leads in the automobile electrical system must be modified. Lead 68 must be spliced to the existing horn wire, and the existing lead from the starter motor solenoid to the solenoid terminal on the ignition switch 11 must be split and connected to the normally open contacts 52. The only other mandatory connections are connections to a source of positive voltage, ground connections which can be to any grounded element, and the control module connection 64 to a positive voltage source at the fuse block. The system is installed with a minimum of connections to existing automobile wiring.

Only three devices need be installed for the total implementation of the system. The digital unit 22 can be easily snapped into an appropriate hole cut into the dash, the control module 62 is simply strapped with wire ties to any hidden rod or group of wires under the dash, and the relay 46 is similarly installed in and out-of-sight position.

In operation, the digital unit 22 supplies total control over the anti-theft system. The system is armed by opening a car door and changing the numerals displayed on digital unit 22 from the preset single combination to any other combination. The driver than exits the car and shuts the automobile door. With the digital unit 22 not displaying the single combination of digits which will allow the car to be started, two anti-theft systems are provided. First, normally open contacts 52 are opened and the solenoid terminal of the ignition switch 11 is disconnected from the starter motor solenoid 12. Solenoid current cannot be supplied and the automobile cannot be started.

Second, with contacts 54 closed, the control module 61 monitors the voltage at the fuse block through lead 64. Should a thief attempt to gain entry by opening the car door, the courtesy lamp will turn on, lowering the voltage at the fuse block. The control module 62 will then start its alarm cycle. In cars equipped with trunk lights, opening of the trunk will also be detected at the fuse block and the alarm cycle started.

A seven second delay is provided between the time the control module 62 senses a light turning on and the intermittent sounding of the horn as an alarm. This delay allows authorized drivers to disarm the unit by inserting the proper numerals in the digital unit 22. If the proper numerals are not in the digital unit within the seven second delay, the horn will sound in a regular, intermittent manner alerting all within the vicinity that an unauthorized entry of the vehicle is taking place.

The optional hood switch 72 bypasses this delay feature and immediately causes the intermittent sounding of the horn upon unauthorized opening of the hood.

Authorized entering of the vehicle is accomplished by opening the door and setting the appropriate numerals on the display 24, 26, 28 of the digital unit 22 with the thumb wheel 32, 34, 36 within the seven second delay provided. When the appropriate numerals are entered, relay coil 44 is energized, opening contacts 54 thereby disarming the control module 62. Relay contacts 52 are closed so that starter motor solenoid current may flow and the automobile may be started.

Should any or all of the various components of this automotive anti-theft system fail while the protected automobile is in operation, operation will not be impaired. This system does not interfere with automotive ignition system as do many systems. Therefore, the engine will continue to run, and power assisted control systems such as brakes and steering will continue to operate and respond in a normal manner.

The invention has been described with reference to specific components. These components can be replaced with similar components performing the same function. Thus, any of a wide variety of digital or analog combination devices can be used to provide the on-off function of the digital unit 22. Further, the control module 62 can be replaced with other similar units providing slightly different functions. One such alternate control module is the Ultimate II manufactured by Harcor International, Inc. This unit is identified by their part number 3015 and is provided with additional sensing and alarm devices not found in the preferred embodiment. The 3015 unit, when used in the present invention allows the addition of a motion sensitive switch and a double alarm system using a siren and a circuit to blink the head lamps on and off. The installation of this alternate control module is similar to the preferred embodiment. However, the difficulty of installation increases as more features are added.

An alternate relay 82 identical to relay unit 44 is also often added. This second relay is connected to provide operation identical to that provided by the digital unit 22. Current to the second relay coil is controlled by a key operated switch 84 in a hidden location. This provides a means to operate the car with a key instead of the combination and is advantageous when the automobile is left in another parties care for service or the like. This second relay circuit will also allow operation of the automobile if the first relay circuit should malfunction.

Having thus described my invention I claim:

1. An automotive anti-theft system comprised of: a combination unit inside the passenger compartment comprised of a series of digital switches having a digital display and thumb wheels for manually changing said digital display having a large number of possible settings, only one of which will cause an associated electrical switch to close; a relay unit having a coil, normally open contacts and normally closed contacts, said relay unit connected to said combination unit such that said relay coil is energized when said combination unit switch is closed, said normally open contact being inserted in the lead between an automotive starter motor solenoid and the solenoid terminal on an automotive ignition switch; a control module having an electrical sensing lead connected through said normally closed contacts of said relay to a positive voltage point at an automotive fuse block and an output line which will supply power to an associated alarm device after a selected delay when said sensing line detects a drop in the positive supply voltage at said fuse block; a second concealed relay unit having a coil, normally open contacts and normally closed contacts; and a concealed key switch supplying power to said second relay coil in one position and interrupting power to said second relay coil in a second position; said second relay normally opened contacts connected in parallel to said first relay unit normally open contacts such that said second relay normally open contacts will complete the connection between said automotive starter motor solenoid and said solenoid terminal on said automotive ignition switch; said second relay unit nromally closed contacts electrically connected in series with said first relay unit normally closed contacts such that said control module electrical sensing lead will be isolated from said positive voltage point at said automotive fuse block when said second relay unit normally closed contacts are opened.

* * * * *